No. 712,413. Patented Oct. 28, 1902.
F. H. RICHARDS.
GOLF BALL.
(Application filed June 14, 1902.)
(No Model.)

Witnesses:
Fred. E. Maynard.
E. A. Jarvis.

Inventor:
F. H. Richards.

UNITED STATES PATENT OFFICE.

FRANCIS H. RICHARDS, OF HARTFORD, CONNECTICUT, ASSIGNOR TO THE KEMPSHALL MANUFACTURING COMPANY, OF ARLINGTON, NEW JERSEY, A CORPORATION OF NEW JERSEY.

GOLF-BALL.

SPECIFICATION forming part of Letters Patent No. 712,413, dated October 28, 1902.

Application filed June 14, 1902. Serial No. 111,781. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Golf-Balls, of which the following is a specification.

This invention relates to playing-balls; and its object is to produce at low cost a strong ball having flying and other properties especially adapting it for use in golf and similar games.

Figure 1:
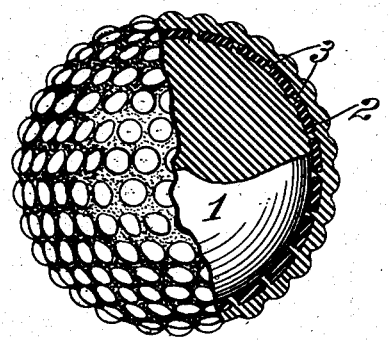
Figure 2:
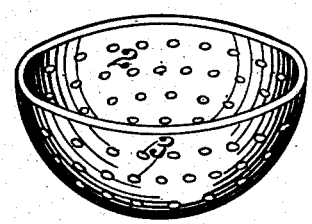

In the accompanying drawings, Figure 1 is a part-sectional view of a ball made in accordance with my present improvements; and Fig. 2 is a view showing a segment of the perforated hard-rubber casing.

In the views like parts are designated by similar characters of reference.

For the core of the ball I preferably employ a sphere 1 of uncured or partially-cured rubber. Over this I place a layer 2 of hard rubber such as used in making hard-rubber goods of commerce and which is provided with perforations 3. Upon this hard-rubber layer I apply segments 4 of rubber, which is preferably strong and able to sustain rough usage without cracking or chipping. The several elements of the balls thus assembled I place in a forming-mold, and then I heat the mold and ball to an extent to cure more thoroughly all of the rubber components of the ball, the curing proceeding far enough to produce a ball having the required characteristics. In curing the several elements each is welded to its mate, while all of the components of the ball are welded together, thus forming a solid and strong ball. By having the several components of the ball originally cured to a certain extent the liability of the sulfur from one layer passing through other layers is reduced, so that each layer may substantially preserve its integrity and characteristics, as indicated at Fig. 1.

The hard-rubber shell 3 gives a very quick response when the ball is tended to be distorted by a blow from a club and also prevents sharp indentations of the outer rubber layer. The center piece 1, which preferably forms a large portion of the body of the ball, may be of a very firm quality of rubber and such as will quickly recover itself from a blow. The outer portion of the ball should be of a tough quality of rubber—such as used, for instance, in forming leather belting and other articles which are subjected to rough usage. By being cured upon the inner portion of the ball said casing is rendered proof against disruption from the latter, which is a very important feature in this class of balls. Thus I produce a ball which is unaffected by the heat of a summer's day and is phenomenally tough and durable and has such extraordinary flying power as to render it suitable for the game of golf, while, as will be observed, it may be produced at low cost.

It will be understood that the core 1 and the hard-rubber layer thereupon are both put into a state of permanent compression, so that they tend constantly to expand the outer rubber shell 4, or, in other words, the compound shell of the ball holds the filling in a state of normal compression.

Variations may be resorted to within the scope of my improvements.

Having thus described my invention, I claim—

1. A ball comprising a firm core, a layer of hard rubber upon said core, said layer having perforations, and a casing of tough rubber embedded in said perforations; all of said rubber elements being vulcanized together.

2. A ball comprising a firm rubber core, a layer of hard rubber having perforations upon said core, and a casing of tough rubber embedded in said perforations; all of said rubber elements being vulcanized together.

3. A playing-ball comprising a relatively thin perforated shell of hard rubber backed by yielding core and also faced by yielding tough rubber, all of said parts being vulcanized together.

4. A playing-ball comprising a relatively thin perforated shell of hard rubber backed by yielding core and also faced by firm rubber casing, all of said parts being vulcanized together.

5. In a playing-ball, a perforated shell of hard rubber backed by a sphere of soft rubber, said shell and sphere being vulcanized together.

6. In a playing-ball, the combination with a perforated thin hard-rubber shell, of a softer-rubber sphere thereon and vulcanized thereto.

7. In a playing-ball, the combination with a perforated thin hard-rubber shell, of a soft-rubber sphere therein, and vulcanized thereto.

8. In a playing-ball, the combination with a perforated thin hard-rubber shell, of a soft-rubber sphere therein and vulcanized thereto, and a harder casing thereon and vulcanized thereto.

9. In a playing-ball, a shell comprising a layer of hard rubber provided with openings and a layer of tough material thereon, and a filling within said hard-rubber layer; said filling consisting at least partially of soft rubber, and being vulcanized to said shell.

FRANCIS H. RICHARDS.

Witnesses:
F. W. BARNACLO,
B. C. STICKNEY.